Figure 1:
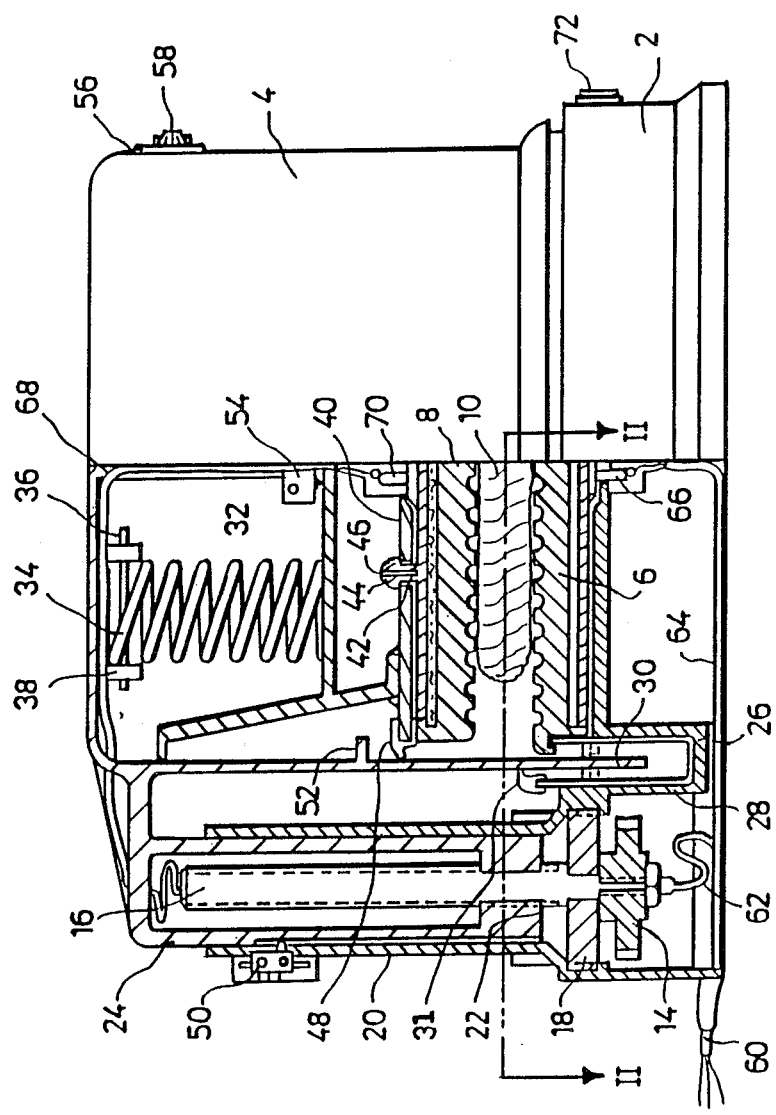

United States Patent [19]
Masel et al.

[11] Patent Number: 4,762,058
[45] Date of Patent: Aug. 9, 1988

[54] GRILLING APPLIANCE

[75] Inventors: Ruben Masel, 16 Hatzabar Street, Kiron, Israel; George Valdshtein, Holon, Israel

[73] Assignee: Ruben Masel, Kiron, Israel

[21] Appl. No.: 44,792

[22] Filed: Apr. 30, 1987

[30] Foreign Application Priority Data

May 1, 1986 [IL] Israel ........................................ 78657

[51] Int. Cl.⁴ .............................................. A47J 37/06
[52] U.S. Cl. ...................................... 99/425; 100/49; 219/443; 219/521; 219/524
[58] Field of Search ................. 99/375, 376, 377, 379, 99/400, 408, 425, 446; 219/524, 525, 443, 521; 100/49

[56] References Cited

U.S. PATENT DOCUMENTS

| | | |
|---|---|---|
| 1,839,112 | 12/1931 | Mills . |
| 1,891,825 | 12/1932 | Martell et al. . |
| 1,929,166 | 10/1933 | Freemon ............................... 99/379 |
| 2,031,259 | 2/1936 | Fox . |
| 2,225,176 | 12/1940 | Lewis et al. . |
| 2,427,451 | 9/1947 | Ellestad . |
| 2,558,294 | 6/1951 | Finizie . |
| 2,632,379 | 3/1953 | Kudo ..................................... 99/375 |
| 2,770,182 | 11/1956 | Jensen . |
| 2,985,094 | 5/1961 | Shaw et al. . |
| 3,010,383 | 11/1961 | Greene ............................... 99/375 X |
| 3,312,161 | 4/1967 | Nanna . |
| 3,490,357 | 1/1970 | Lescure . |
| 3,682,655 | 8/1972 | Touba . |
| 3,713,379 | 1/1973 | Gordy ............................... 99/425 X |
| 3,719,507 | 4/1973 | Bardeau . |
| 3,736,859 | 6/1973 | Carlson . |
| 3,746,837 | 7/1973 | Frey et al. ....................... 219/525 X |
| 3,824,916 | 7/1974 | Green et al. ...................... 99/425 X |
| 3,938,431 | 2/1976 | Potvin .................................... 99/425 |
| 4,011,431 | 3/1977 | Levin . |
| 4,027,139 | 5/1977 | Theimer . |
| 4,364,308 | 12/1982 | John et al. . |
| 4,483,239 | 11/1984 | Mueller et al. . |
| 4,567,819 | 2/1986 | Adamson . |
| 4,574,689 | 3/1986 | Robertson . |
| 4,586,428 | 5/1986 | Adamson . |
| 4,627,335 | 12/1986 | Sherman et al. . |

FOREIGN PATENT DOCUMENTS

| | | | |
|---|---|---|---|
| 93529 | 9/1967 | France . | |
| 321850 | 7/1957 | Switzerland ......................... 99/375 |
| 401917 | 11/1933 | United Kingdom ................. 99/379 |

Primary Examiner—John M. Jillions
Attorney, Agent, or Firm—Helfgott & Karas

[57] ABSTRACT

A grilling appliance having a lower housing section containing a lower grill plate and an upper housing section containing an upper grill plate. The upper section is movable between an open position for placing a food article to be grilled on the lower grill plate, and a closed position defining with the lower housing section a heating chamber containing the two grill plates for grilling therebetween food articles. A water container is included in one of the housing sections for receiving water to saturate the heating chamber with water vapor during the grilling of the food article.

10 Claims, 2 Drawing Sheets

GRILLING APPLIANCE

The present invention relates to grilling appliances, and particularly to the type including a pair of grill plates receiving the food article between them.

Grilling appliances of the foregoing type have a number of drawbacks: thus, the time required for grilling is relatively long; they tend to produce a splattering of grease and an emission of odors; they also tend to dry out the grilled article because of the intensive evaporation of water from the food article; and they usually require intensive and difficult cleaning after use.

An object of the present invention is to provide a grilling appliance having advantages in the above respects.

According to the present invention, there is provided a grilling appliance comprising a lower housing section containing a lower grill plate; and an upper housing section containing an upper grill plate and movable either to an open position for placing a food article to be grilled on the lower grill plate, or to a closed position defining with the lower housing section a heating chamber containing the two grill plates for grilling therebetween the food article; characterized in that one of the housing sections includes a water container for receiving water to saturate the heating chamber with water vapor during the grilling of the food article.

In the preferred embodiment of the invention described below, the two housing sections include sealing means for sealing the heating chamber during the grilling of the food article. In addition, the water container is a channel member in the lower housing section, and receives an extension of the upper housing section when in its closed position such that the extension is submerged in the water in the channel to constitute at least part of the sealing means.

In addition, the upper housing section includes spring means for urging the upper grill plate against the food article between the two grill plates in the closed condition of the two housing sections, and manually adjustable presetting means for manually presetting the magnitude of the force to be applied by the upper grill plate against the food article between the two grill plates.

A grilling appliance constructed in accordance with the foregoing features provides a number of advantages over the known appliances; thus, the humid environment during the grilling operation, and also the mechanical pressure applied to the pair of grill plates and the food article between them, have been found to significantly improve the heat transfer properties of the food article (particularly meat and other protein products), and the boundary layers between the food article and the grill plates, such as to substantially reduce the required grill time, and also to substantially reduce the required grill temperature. The foregoing characteristics not only save energy, but also avoid the drying out of the food article. Further, because the heating chamber is sealed, there is no splattering of grease nor emission of odors. Still further, since most of the liquids produced during the grilling operation drain from the lower grill plate into the water container, the cleaning of the appliance after use is greatly facilitated.

Further features and advantages of the invention will be apparent from the description below.

Figure 2:
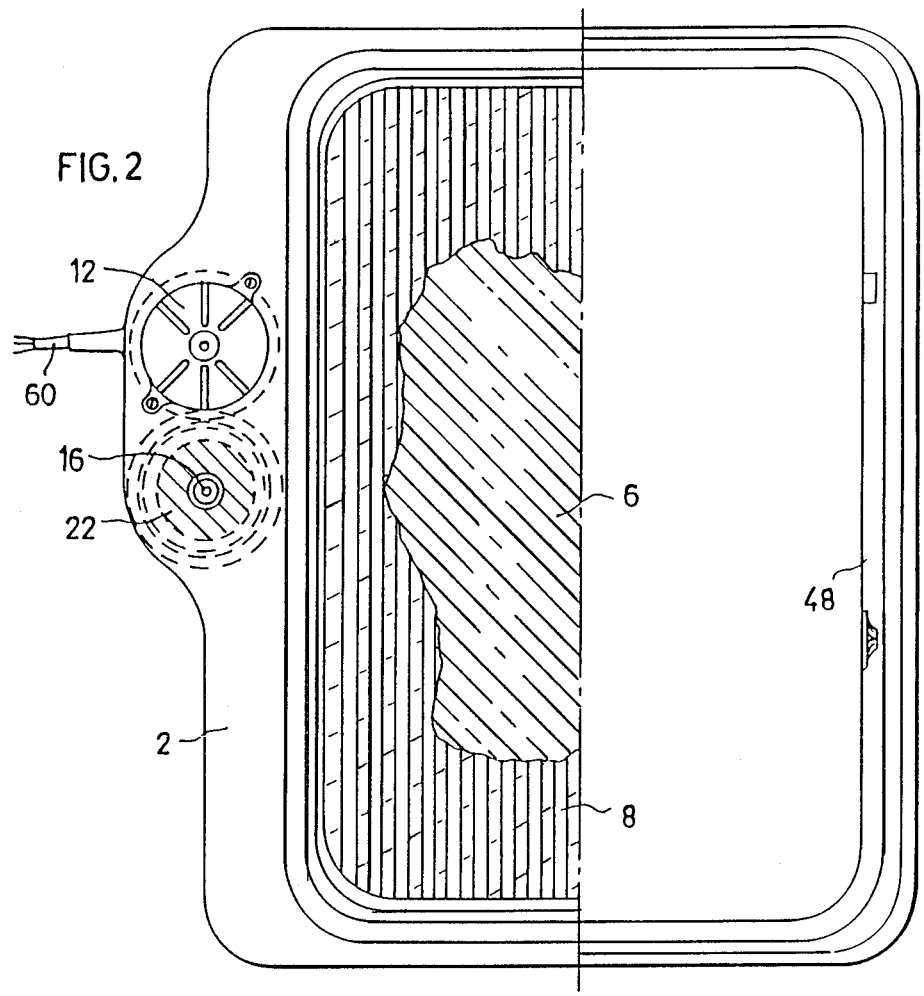
Figure 3:
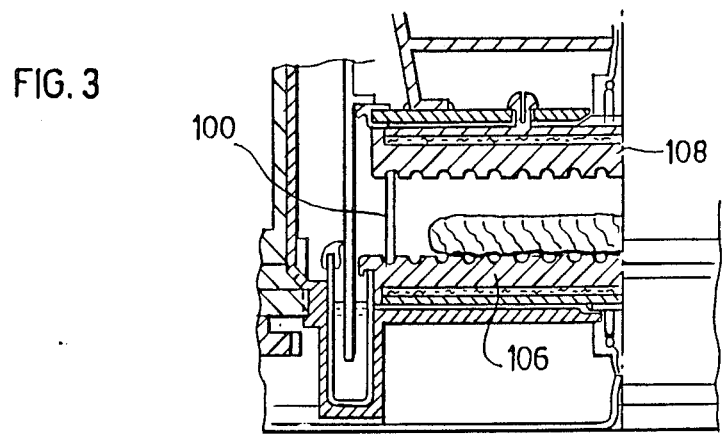

The invention is herein described, by way of example only, with reference to the accompanying drawings, wherein: FIG. 1 is an end elevational view, partly in section, illustrating one form of grilling appliance constructed in accordance with the present invention; FIG. 2 is a top plan view, partly in section along lines II—II of FIG. 1; and FIG. 3 illustrates a modification.

The grilling appliance illustrated in the drawings comprises two housing sections, namely a lower housing section 2 and an upper housing section 4. The lower housing section 2 contains the lower grill plate 6 and serves as a base for supporting the upper housing section 4, which contains the upper grill plate 8. The upper housing section 4 is movable either to an upper open position to permit the user to place a food article 10 on the lower grill plate 6, or to a lower position wherein the upper grill plate 8 comes in contact with the food article to heat it between the two grill plates.

The upper housing section 4 is raised and lowered by an electric motor 12 (FIG. 2) mounted in the lower housing section 2. Motor 12 is coupled by a gear 14 (FIG. 1) to a vertically-extending screw 16 rotatably mounted within a bearing 18 at one side of the lower housing section. Screw 16 is surrounded by a guide tube 20 fixed to the lower housing section.

Rotatable screw 16 cooperates with a nut 22 fixed to the end of another guide tube 24 carried by the upper housing section 4 in telescoping alignment with guide tube 20. The arrangement is such that rotation of screw 16 by electric motor 12, drives nut 22, and thereby the upper housing section 4 upwardly or downwardly with respect to the lower housing section 2 while guided by the telescoping engagement of the two guide tubes 20 and 24. The nut 22 and screw 16 have mating key and keyway portions such as to prevent rotation of the upper housing section 4 with respect to the lower housing section 2 except at the extreme upward position of the upper housing section.

The lower housing section 2 is formed with an annular channel section 26 circumscribing the lower grill plate 6. Disposed within channel section 26 is an annular channel member 28 adapted to serve as a water container. The upper housing section 4 is formed with an annular extension 30 of the same configuration as channel member 28 and is adapted to be received within the channel member when the upper housing section is in its lower closed condition and submerged within the water in channel member 28 as shown in FIG. 1. The outer face of channel member 28 carries a seal 31 which is engageable with the outer face of extension 30 of the upper housing section 4. The inner face of extension 30 is spaced slightly from the inner wall of channel member 28 to provide a path for liquids (e.g., grease, oil, juices) to drain from the lower grill plate 6 into the water contained in channel member 26.

The upper grill plate 8 is carried by a carrier 32 of rectangular configuration and pressed towards the lower grill plate by a plurality of coil springs secured at one end to the inner face of the upper housing section 4, and bearing at the opposite end against the carrier 32. Only one such spring 34 is illustrated in FIG. 2, but it will be appreciated that there are preferably four such springs, each attached in one of four quadrants of the carrier member 32. The attaching means is illustrated in FIG. 1 as comprising a pin 36 received between the two upper coils of the spring and supported in a pair of lugs 38.

A mounting plate 40 is secured to carrier member 32, and is formed with an opening 42 in each of the four quadrants. Each of the openings 42 is adapted to receive a pin 44 carried by the upper face of the upper grill plate 8 and terminating in an enlarged head for mounting the grill plate to mounting plate 40. Each pin is axially split, as shown at 46 in FIG. 1, to permit quick attachment and detachment for cleaning.

The upper grill plate 8 and its carrier 32 are free to move to some extent about the two horizontal axes in order to permit the grill plate 8 to conform to the contour of the food article 10 received between it and the lower grill plate 6. In addition, an annular sealing ring 48 is applied around the outer periphery of mounting plate 40 in engagement with the inner face of extension 30 of the upper housing section 4 in order to seal the upper space of the upper housing section occupied by springs 34 from the lower space occupied by the two grill plates 6 and 8 in which the food article 10 is heated.

A microswitch 50 is fixed to the upper end of the lower housing section 2 and is engageable with the outer face of guide tube 20 of the upper housing section 4, but disengages therefrom when the upper housing section has been moved to its fully open position by electric motor 12. Switch 50, when actuated by its disengagement from guide tube 20, turns off the electric motor 12. It thus acts as a limit switch for limiting the fully open position of the upper housing section 4.

Another microswitch 54 is carried by the upper housing section 4 and is engageable by carrier member 32 of that section to turn off the motor in the fully closed position of the upper housing section. The coil springs 34 normally support carrier member 32 spaced slightly below limit switch 54 such that, when the upper housing section 4 is driven downwardly by motor 12 to the closed position of the upper housing section, limit switch 54 is not engaged by carrier member 32 until the upper grill plate 8 has engaged the food article 10 and has applied a predetermined pressure against it. This pressure is determined by the spacing of switch 54 from carrier member 32. In order to permit manual presetting of this predetermined pressure applied by the upper grill plate 8 against the food article 10, limit switch 54 is movable in the vertical direction by a handle 56 accessable to the user from the outer face of the upper housing section 4. Handle 56 thus permits manual presetting of the position of limit switch 54, and thereby the pressure to be applied by the upper grill plate 8 against the food article 10.

The illustrated appliance further includes a thermostat 58 which may also be manually preset by the user according to any desired temperature. The heat-sensor element (not shown) of thermostat 58 is located in good thermal relationship with the upper grill plate 8 so as to maintain a substantially constant temperature of that grill plate, and also of the lower grill plate 6.

The illustrated appliance further includes a power input conductor 60, electrical conductors 62 connected to motor 12, electrical conductors 64 connected via connector 66 to the lower grill plate 6, and electrical conductors 68 connected via a connector 70 to the upper grill plate 8. Connectors 66 and 70 are of the quickly-attachable type to permit quick attachment and detachment of the grill plates for cleaning or repair. The illustrated appliance further includes a manual switch 72 for turning on the appliance and for energizing it in the "up" direction for opening the two housing sections 2 and 4, or in the "down" direction for closing the two housing sections.

The illustrated appliance operates as follows:

First, it is assumed that the water container (channel member 28) is filled with clean water; that handle 56 has been preset to a selected position to preset the lower limit switch 54 according to the pressure desired to be applied by the upper grill plate 8 against the food article 10 when the upper housing section 4 is in its fully closed position with respect to the lower housing section 2; and that thermostat 58 has been preset to the preselected grilling temperature. The appliance may also include a timer (not shown) of conventional construction in the electrical circuit, which timer may be preset according to the desired grilling time. The appliance may still further include conventional indicator lamps, to indicate when the appliance has been turned on and when the preselected temperature has been reached.

Assuming the appliance is in the illustrated closed condition, manual switch 72 is operated to open the appliance. This energizes electric motor 12 which rotates screw 16 to raise nut 22 carried by the upper housing section 4, thereby raising the upper housing section; this movement is guided by the telescoping guide tubes 20 and 24. The upper housing section 4 is driven upwardly until limit switch 50 disengages from the outer face of the upper guide tube 20, at which time the switch 50 turns off the motor.

The food article to be grilled is then placed on the lower grill plate 6, and manual switch 72 is operated to close the appliance. This causes motor 12 to rotate in the opposite direction, thereby lowering the upper housing section 4 until the upper grill plate 8 contacts the food article 10 and starts to compress spring 34. The lowering movement continues until carrier member 32 engages the lower limit switch 54, at which time the motor is deenergized. When this occurs, a predetermined pressure is applied by springs 34 and the upper grill plate 8 against the food article 10, which predetermined pressure was initially preset by the vertical positioning of lower limit switch 54 by handle 56.

During the lowering movement of the upper housing section 4, its extension 30 enters and submerges within the water in the water container defined by channel member 28 circumscribing the lower grill plate 6. Thus, the water within channel member 28, as well as the annular sealing member 22 engaging the outer face of extension 30 and the annular sealing member engaging its inner face, effectively seal the interior of the heating chamber containing the two grill plates 6 and 8.

The two grill plates were previously energized by their respectively electrical heating their elements to the preselected temperature, as controlled by thermostat 58. The timer if one is provided, begins to operate when the lower limit switch 54 has been attached. It will be appreciated that the grilling of the food article is effected while the food article is under a predetermined pressure between the two grill plates 6, 8, as determined by the setting of handle 56 as described above. It will also be appreciated that during this heating of the food article, water within channel member 28 is vaporized so as to saturate the heating chamber with water vapor.

After the food article has been properly grilled, the timer (if one is provided) or manual switch 72 may be operated to open the upper housing section 4. This permits removal of the grilled food article 10 and the introduction of another food article to be grilled.

It will thus be seen that the illustrated arrangement provides a number of important advantages over the known grilling appliances. The combination of the mechanical pressure applied by the two grill plates against the food article, and the humidified atmosphere produced by the water within channel member 28 during the grilling operation, substantially increase the heat transfer properties of the boundary layers between the two grill plates and the food article and also of the interior of the food article, such that the grilling time is very substantially reduced; also the grilling temperature may be substantially reduced.

For example, it has been found that a full size steak may be grilled (to "medium") in about 40-50 seconds, at a relatively low plate temperature of about 150°-200° C., and that hamburger takes about 20-30 seconds, both of which time periods are substantially shorter than those required in conventional grilling appliances. This combination of short grilling time and relatively low grilling temperature also substantially reduces the electrical energy required. Moreover, since the heating chamber is sealed by the water within channel member 28, as well by seals 31 and 48, there is no splattering of grease or emission of odors during the grilling operation. In addition, the short grilling time, low temperature, and humidified atmosphere also preserve the taste, juices, and nutrients of the food article, and prevent it from drying out. Further, because of the relatively low temperature, the housing can be manufactured from plastic materials suitable for low-cost, volume production and attractive designing. Still further, the illustrated appliance is relatively easy to clean since most of the liquids produced during the grilling operation drain into the water within channel member 28, which can be conveniently removed and replenished with clean water as desired; the grill plates may also be conveniently removed for cleaning purposes.

FIG. 3 illustrates a modification whereas a separate rectangular frame 100, open at the top and bottom, may be interposed between the two grill plates 106 and 108 to limit the inner position of the upper grill plate 108, and to define a confined space or oven for the food articles to be heated. Such a frame may be supplied as an attachment for converting the grill to an oven for cooking all types of food articles, e.g., eggs, sandwiches, etc.

While the invention has been described with respect to one preferred embodiment, it will be appreciated that many variations may be made. For example, the annular seal 31 may include two metal ribbons separated by an air gap, such that if an obstacle is encountered during the closing of the upper housing section 4, the two metal ribbons will come into contact to produce a signal preventing the further lowering of the upper housing section and thereby avoiding damage.

Many other variations, modifications and applications of the invention will be apparent.

What is claimed is:

1. A grilling appliance comprising: a lower housing section containing a lower grill plate; and an upper housing section containing an upper grill plate and movable between an open position for placing a food article to be grilled on the lower grill plate, and a closed position defining with the lower housing section a heating chamber containing the two grill plates for grilling therebetween the food article; a water container in one of said housing sections for receiving water, and sealing means for enclosing the water container within the heating chamber whereby the water can saturate the heating chamber with water vapor during the grilling of the food article.

2. The appliance according to claim 1, and further comprising sealing means between said two housing sections for sealing the heating chamber during the grilling of the food article.

3. A grilling appliance comprising: a lower housing section containing a lower grill plate; and an upper housing section containing an upper grill plate and movable between an open position for placing a food article to be grilled on the lower grill plate, and a closed position defining with the lower housing section a heating chamber containing the two grill plates for grilling therebetween the food article; and a water container in one of said housing sections for receiving water to saturate the heating chamber with water vapor during the grilling of the food article, and wherein said water container comprises a channel member in the lower housing section, and further comprising an extension of the upper housing section received in said water container when said upper housing section is in its closed position such that said extension is submerged in the water in said channel to constitute at least part of said sealing means.

4. The appliance according to claim 3, wherein said channel member comprises an inner and outer side and said upper housing section extension has an inner and outer face and wherein said sealing means further comprises a sealing element carried by the outer side of channel member and engageable with the outer face of said upper housing extension, the inner face of said extension being spaced from the inner side of said channel member permitting liquid produced during the grilling operation to freely drain from said lower grill plate into said channel.

5. The appliance according to claim 4, wherein said channel and extension are both of annular configuration circumscribing the two grill plates in the closed condition of the two housing sections.

6. The appliance according to claim 3 comprising a channel section formed in said lower housing section and wherein said channel member is removably received in said channel section.

7. A grilling appliance comprising: a lower housing section containing a lower grill plate; and an upper housing section containing an upper grill plate and movable between an open position for placing a food article to be grilled on the lower grill plate, and a closed position defining with the lower housing section a heating chamber containing the two grill plates for grilling therebetween the food article; and wherein said upper housing section further comprises means for urging the upper grill plate against a food article placed between the two grill plates in the closed position of the two housing sections, means for maintaining a force onto the food article throughout the grilling of the article, and manually adjustable presetting means for manually presetting the magnitude of the force to be applied by the upper grill plate against the food article between the two grill plates during the grilling of the article.

8. The appliance according to claim 7, and further comprising an electric motor for moving said upper housing section between its open and closed positions, and a member carried by said upper plate, said presetting means comprising a limit switch engagable by the member carried by said upper grill plate and manually adjustable with respect to said upper grill plate so as to be actuated to stop the motor when the upper grill plate has been displaced by the upper food article against the force of said spring means a predetermined distance corresponding to the preset pressure.

9. The appliance according to claim 8 comprising a carrier member carrying said upper grill plate and wherein said spring means comprises at least one coil spring interposed between the interface of said upper housing section and said carrier member carrying said upper grill plate.

10. The appliance according to claim 9, wherein said carrier member actuates said limit switch when the preset pressure is reached when said two housing sections are closed, said appliance also comprising a second limit switch, said upper housing section actuating said second limit switch when the upper housing section has been moved to a predetermined open position with respect to said lower housing section.

* * * * *